United States Patent [19]
Shimura et al.

[11] Patent Number: 5,997,914
[45] Date of Patent: Dec. 7, 1999

[54] PROCESS FOR MAKING BREAD

[75] Inventors: Kaori Shimura, Machida; Yasuhisa Kyogoku, Ami-machi; Kozo Ouchi, Hasuda; Takaoki Torigoe, Ryugasaki, all of Japan

[73] Assignee: Kyowa Hakko Kogo Co., Ltd., Tokyo, Japan

[21] Appl. No.: 09/251,727

[22] Filed: Feb. 18, 1999

Related U.S. Application Data

[63] Continuation of application No. PCT/JP95/00172, Feb. 8, 1995, and application No. 08/687,619, Aug. 8, 1996, abandoned.

[30] Foreign Application Priority Data

Feb. 9, 1994 [JP] Japan .................................. 6-15443

[51] Int. Cl.⁶ ............................. A21D 8/04; A21D 10/00; A23C 9/12; C12N 1/18
[52] U.S. Cl. .............................. 426/27; 426/19; 426/61; 426/62; 426/549; 426/551; 426/391; 426/496; 426/498; 435/255.2
[58] Field of Search .................. 426/19, 27, 61, 426/62, 549, 551, 561, 384, 391, 496, 498, 524; 435/255.2

[56] References Cited

U.S. PATENT DOCUMENTS

| | | | |
|---|---|---|---|
| 3,894,155 | 7/1975 | Shoji et al. | 426/25 |
| 4,547,374 | 10/1985 | Nakatomi et al. | 426/19 |
| 5,262,182 | 11/1993 | Kasahara et al. | 426/19 |
| 5,352,606 | 10/1994 | Takano et al. | 435/255.2 |

FOREIGN PATENT DOCUMENTS

| | | | |
|---|---|---|---|
| 27417/84 | 11/1984 | Australia . | |
| 61750/90 | 2/1991 | Australia . | |
| 57704/94 | 9/1994 | Australia . | |
| 0078182 A2 | 4/1983 | European Pat. Off. | A21D 8/04 |
| 0 194 189 | of 1986 | European Pat. Off. . | |
| 0 196 233 | 3/1986 | European Pat. Off. | A21D 6/00 |
| 487878 A1 | 1/1991 | European Pat. Off. | C12N 1/18 |
| 0 667 099 | 8/1995 | European Pat. Off. . | |
| 2 442 588 | of 1980 | France . | |
| 60-15308 B2 | 4/1985 | Japan . | |
| 336872 | of 1993 | Japan . | |
| 405284896 | 2/1993 | Japan | A21D 8/04 |
| 92/18010 | of 1992 | WIPO . | |
| 93/22928 | 11/1993 | WIPO . | |

OTHER PUBLICATIONS

"New Freeze–Tolerant Yeast for Frozen Dough Preparations" Hino, Takano, Tanaka, Cereal Chemistry, vol. 64, No. 4, 1987 pp. 269–275.

*Primary Examiner*—Keith D. Hendricks
*Attorney, Agent, or Firm*—Antonelli, Terry, Stout & Kraus, LLP

[57] ABSTRACT

The present invention relates to a process for making bread, specifically, a process which involves the storage of dough under freezing and then under refrigeration or the storage of dough under refrigeration and then under freezing, and further relates to a freezing and refrigeration resistant yeast to be used in the process.

10 Claims, No Drawings

PROCESS FOR MAKING BREAD

CROSS REFERENCE TO RELATED APPLICATION

This application is a Continuation application of Ser. No. 08/687,619, filed on Aug. 8, 1996, and PCT/JP95/00172, filed Feb. 8, 1995, the contents of which are incorporated herein by reference in their entirety.

TECHNICAL FIELD

The present invention relates to a process for making bread, specifically, a process which involves the storage of dough under freezing and then under refrigeration or the storage of dough under refrigeration and then under freezing, and further relates to a freezing and refrigeration resistant yeast to be used in the process.

BACKGROUND ART

In recent years, in the bread manufacturing industry, a method for making broad with frozen dough is used as one of the means of rationalization of production. In this method, a process for making bread is interrupted by freezing dough and the frozen dough can be baked after the final proof following thawing, which enables the control of the process. As frozen dough endures a long-term storage, dispersion of the work in the bread-making process becomes possible. Further, if large-scale bakeries can send frozen dough from their factories to local bakeries, they can bake frozen dough in their ovens and offer just baked bread to the consumers at the stores. However, frozen dough has, at the same time, some defects; for example, the operation must be started earlier, because frozen dough takes much time to be completely thawed, and frozen dough must be baked soon after being thawed, because, after thawing, fermentation proceeds and dough cannot be preserved.

As another means of rationalization of production, a method for making bread with refrigerated dough is used. In this method, prepared dough is stored at a low temperature in such a range that dough may not freeze and is baked after the final proof as occasion demands. Compared with the method using frozen dough, this method saves cost in freezing, freeze-storage, freeze-transportation, thawing, etc., and also saves time up to the step of baking, for thawing is not necessary.

However, in cases where refrigerated dough is used, not only undesirable effects appear on dough, but also yeast in the dough will have a problem with respect to the storage stability and will deteriorate, because yeast ferments even during the storage of refrigerated dough. Consequently, the bread obtained by baking such dough has a small volume (specific volume) and is poor in appearance and crumb properties.

To solve these problems, the following are known as methods for making one-loaf bread, pizza, etc. using bread yeast having the refrigeration resistance: a method for making one-loaf bread and bins using bread yeast belonging to the genus Saccharomyces which is capable of controlling fermentation at a low temperature (−5 to 15° C.), e.g., *Saccharomyces cerevisiae* IAM4274 (Japanese Published Unexamined Patent Application No. 195637/86); a method for making frozen bread dough using *Saccharomyces cerevisiae* IAM4274 (Japanese Published Examined Patent Application No. 58536/88); a method for making one-loaf bread, buns, etc., using bread yeast belonging to the genus Saccharomyces which shows the low-temperature-sensitivity and the freeze-resistance (Japanese Published Unexamined Patent Application No. 234939/92); a method for making pizza using bread yeast belonging to the genus Saccharomyces which is inactive but shows viability under refrigeration (Japanese Published Unexamined Patent Application No. 76348/93, EP487878A); a method for making one-loaf bread, etc. using bread yeast belonging to the genus Saccharomyces which shows the low-temperature-sensitivity and doesn't reduce the fermentability even when dough is refrigerated (Japanese Published Unexamined Patent Application No. 284896/93); and a method for making one-loaf bread, buns, etc. using yeast of which the fermentability is low-temperature-sensitive (Japanese Published Unexamined Patent Application No. 336872/93). Also is known bread yeast belonging to the genus Saccharomyces which shows the low-temperature-sensitivity at 0 to 10° C. (EP556905A).

The present inventors obtained some of the yeast strains described in the above publications and measured the amount of carbon dioxide gas generated from dough containing the yeast strains after the storage under freezing and refrigeration to observe the fermentability of dough as shown in Table 1 below. However, the results were not satisfactory and the quality of the bread made from said dough was not good enough.

An object of the present invention is to make bread which is excellent in specific volume, etc., even with dough containing yeast which underwent storage under freezing and refrigeration.

DISCLOSURE OF THE INVENTION

The present invention relates to a process for making bread, characterized in that dough is prepared by kneading a mixture of flour or rye flour, yeast and water, and the prepared dough is frozen and then refrigerated or refrigerated and then frozen, followed by ordinary bread-making steps.

The term "bread" as used herein includes all kinds of bread prepared by using yeast as a leavening agent such as Chinese buns and yeast doughnuts, besides so-called bread such as ordinary one-loaf bread, buns, and Danish pastries.

In the present invention, any yeast may be used, as long as the fermentability of dough containing the yeast is maintained after the storage under freezing followed by refrigeration, or the storage under refrigeration followed by freezing. A preferred example is yeast belonging to the genus Saccharomyces which gives dough fermentability in such a degree that the dough containing the yeast and 5–15% sugar generates carbon dioxide gas in an amount of more than 100 ml/0.6 g (yeast cells) at 30° C. in 2 hours after the storage at −20° C. for 7 days and then at 5° C. for 4 days, or that the dough containing the yeast and 5–15% sugar generates carbon dioxide gas in an amount of more than 80 ml/0.6 g (yeast cells) at 30° C. in 2 hours after the storage at 5° C. for 4 days and then at −20° C. for 7 days (the yeast is referred to as freezing and refrigeration resistant yeast).

The dough containing the yeast and 5 or 15% sugar used in the present invention has the following composition.

| Dough Composition | (Unit: g) |
| --- | --- |
| Hard flour | 100 |
| Sugar | 5 or 15 |
| Salt | 2.0 or 1.2 |

-continued

| Dough Composition | (Unit: g) |
|---|---|
| Water | 62 or 58 |
| Yeast cells (obtained by the cultivation described in Example 1) | 3 |

The freezing and refrigeration resistant yeast used in the present invention may be selected from the strains separated from nature or the strains stored at research laboratories, etc. However, they are usually obtained by mutating freezing resistant yeast as a parent strain and then by selecting mutants having the low-temperature-sensitive fermentability, or by mutating a mutant having the low-temperature-sensitive fermentability as a parent strain and then by selecting freezing resistant mutants.

For example, freezing and refrigeration resistant yeast can be obtained in the following manner using freezing resistant yeast as a parent strain.

Freezing resistant yeast (for example, bread yeast, sake yeast, wine yeast, beer yeast, miso and shochu yeast) is subjected to known mutagenesis such as irradiation with ultraviolet light or radiation. The obtained cells are brought into contact with an antibiotic (for example, antimycin and nystatin), and cultivated at a low temperature (10 to 15° C.) to select the cells which show no proliferation or very poor proliferation at the low temperature (the primary selection). The strains selected in the primary selection include the strains which show no proliferation ability or poor proliferation ability due to the suppression of energy metabolism caused by the lack or lowering of fermentability at the low temperature, as well as the strains which show no proliferation ability or poor proliferation ability due to other causes, for example, mutation of proliferation control mechanism. From them are selected the strains which show no fermentability or extremely low level of fermentability at a temperature of 15° C. or lower (the secondary selection). Then, from the strains selected in the secondary selection, the strains are selected which recover the normal fermentability at a temperature of 20° C. or higher (20 to 40° C.) (the tertiary selection). Finally, from the strains selected in the tertiary selection, the strains are selected which can be used for making normal bread by a method in which freezing of dough and refrigeration of dough are combined (the quaternary selection).

Specific examples of the strains used in the present invention are *Saccharomyces cerevisiae* RRT16 (hereinafter referred to as RRT16) and FSC5531 (hereinafter referred to as FSC5531).

The process for obtaining RRT16 is described below.

Cells of *Saccharomyces cerevisiae* FSC005 (hereinafter referred to as FSC005) which is bread yeast having the characteristics shown in Table 1 are cultivated at 30° C. for 12 hours in YPD medium comprising 1% yeast extract, 2% polypeptone and 2% glucose, and centrifuged to collect cells. The collected cells are suspended in 0.067 M potassium dihydrogenphosphate solution to a density of $1 \times 10^7$ cells/ml to give the absorbance of 1.0. After this cell suspension is irradiated with ultraviolet light so that the survival rate of cells becomes 1–30%, the cells are subjected to the primary selection.

The primary selection is conducted as follows. The cell suspension subjected to ultraviolet light treatment (200 $\mu$l) is inoculated into 5 ml of YPD medium and cultivated at 30° C. for 12 hours, followed by centrifugation to collect cells. The collected cells are cultivated in 1 ml of nitrogen-free minimum medium comprising 0.17% Yeast Nitrogen Base w/o amino acids and ammonium sulfate (Difco Laboratories) and 1% glucose at 30° C. for 12 hours, and the culture was centrifuged again to collect cells. The collected cells are suspended in 0.9 ml of YPD medium containing $1 \times 10^{-5}$ M antimycin, and cultivated at 10° C. for 24 to 36 hours.

To the resulting culture is added 10 $\mu$g/ml nystatin, followed by cultivation at 10° C. for 2 hours. After centrifugation, the collected cells are spread on YPD plate medium comprising 1% yeast extract, 2% polypeptone, 2% glucose and 2% agar, and cultivated at 30° C. for 48 hours to grow colonies.

The secondary selection is conducted as follows. The colonies separated in the primary selection are transferred onto YPG plate medium comprising 1% yeast extract, 2% polypeptone, 3% glycerol and 2% agar, and cultivated at 30° C. for 24 hours to grow colonies. A pigment agar medium comprising 0.5% yeast extract, 1% peptone, 10% sucrose, 0.02% Bromocresol Purple and 1% agar is layered over the colonies, and the colonies are cultivated at 5° C. for 12 hours. Selection can be made based on the color change at the periphery of the colonies during the cultivation, as the strains having the normal fermentability at 5° C. change from purple to yellow in color, while the strains having no fermentability or low level of fermentability at 5° C. do not change at all or change slightly in color.

The tertiary selection is conducted as follows. The colonies selected in the secondary selection are transferred onto YPG plate medium and cultivated at 30° C. for 24 hours to grow colonies. The above-mentioned pigment agar medium is layered over the colonies, and the colonies are cultivated at 30° C. for 2 hours. The strains are obtained which have sufficient fermentability by selecting the strains which show the color change from purple to yellow at the periphery of colonies.

The quaternary selection is conducted as follows. The strains selected in the tertiary selection are cultivated by the method described in Example 1 to obtain cells. Bread dough is prepared using the cells according to the following dough composition and preparation processes, and the amount of the carbon dioxide gas generated from the dough after storage under freezing and refrigeration is measured at 30° C. From the tested strains, an excellent strain is selected. The strain obtained by the above process was named RRT16.

FSC5531 was obtained by selecting an excellent strain from the strains stored at Kyowa Hakko Kogyo Co., Ltd. by the same method as in the quaternary selection described above.

RRT16 and FSC5531 were deposited with The National Institute of Bioscience and Human-Technology, Agency of Industrial Science and Technology on Dec. 19, 1993 under the Budapest Treaty, with accession Nos. FERM BP-4489 and FERM BP-4488, respectively.

| Dough Composition | (Unit: g) |
|---|---|
| Hard flour | 100 |
| Sugar | 5 or 15 |
| Salt | 2.0 or 1.2 |
| Water | 62 or 58 |
| Yeast cells | 3 |

Process in which storage under

-continued freezing is followed by storage under refrigeration

Steps: Mixing (at 100 rpm for 2 minutes with National Complete Mixer)
↓
Prefermentation (at 30° C. and 85% relative humidity for 45 minutes)
↓
Punching, dividing the dough is divided into five equal parts: 34.4 or 35.4 g each (the weight of bread yeast cells in each portion: 0.6 g)
↓
Storage under freezing (in the freezer at −20° C. for 7 days)
↓
Storage under refrigeration (in the refrigerator at 5° C. for 4 days)
↓
Storage at 30° C and 85% relative humidity for 30 minutes
Measurement of the amount of carbon dioxide gas generated in 2 hours at 30° C. with a Fermograph (Product of ATTO Co., Ltd.)

Process in which storage under refrigeration is followed by storage under freezing Steps: Mixing (at 100 rpm for 2 minutes with National Complete Mixer)
↓
Dividing the dough is divided into five equal parts: 34.4 or 35.4 g each (the weight of yeast cells in each portion: 0.6 g)
↓
Storage under refrigeration (in the refrigerator at 5° C. for 4 days)
↓
Storage under freezing (in the freezer at −20° C. for 7 days)
↓
Storage at 30° C. and 85% relative humidity for 50 minutes)
↓
Measurement of the amount of carbon dioxide gas generated in 2 hours at 30° C. with a Fermograph (Product of ATTO Co., Ltd.)

The results are shown in Table 1.

TABLE 1

| Strains | Dough | Amount of Carbon Dioxide Gas (ml) −20° C., 7 days (freezing) 5° C., 4 days | 5° C., 4 days (refrigeration) −20° C., 7 days (freezing) |
|---|---|---|---|
| RRT16 | 5% dough | 116 | 101 |
| FSC5531 | 5% dough | 115 | 81 |
| FSC005 | 5% dough | 95 | 57 |
| YST[1] | 5% dough | 91 | 34 |
| RZT3[2] | 5% dough | 80 | 52 |
| IAM4274[3] | 5% dough | 87 | 66 |
| NCIMB40328[4] | 5% dough | 37 | 28 |
| NCIMB40329[4] | 5% dough | 83 | 74 |
| NCIMB40330[4] | 5% dough | 79 | 75 |
| NCIMB40331[4] | 5% dough | 72 | 76 |
| NCIMB40332[4] | 5% dough | 82 | 75 |
| RRT16 | 15% dough | 112 | 89 |
| FSC5531 | 15% dough | 129 | 96 |
| FSC005 | 15% dough | 96 | 45 |
| YST | 15% dough | 94 | 14 |
| RZT3 | 15% dough | 54 | 49 |
| IAM4274 | 15% dough | 94 | 68 |
| NCIMB40328 | 15% dough | 29 | 23 |
| NCIMB40329 | 15% dough | 94 | 73 |
| NCIMB40330 | 15% dough | 84 | 72 |
| NCIMB40331 | 15% dough | 91 | 78 |
| NCIMB40332 | 15% dough | 96 | 74 |

(Note)
[1]YST: Dia Yeast YST (commercially available bread yeast, Kyowa Hakko Kogyo Co., Ltd.)
[2]RZT3: Yeast mentioned in Japanese Published Unexamined Patent Application No. 336872/93
[3]IAM4274: Yeast mentioned in Japanese Published Unexamined Patent Application No. 195637/86 and Japanese Published Examined Patent Application No. 58536/88
[4]NCIMB40328–40332: Yeast strains mentioned in Japanese Published Unexamined Patent Application No. 76348/93 and EP487878A As it is clear from Table 1, the yeast strains of the present invention, RRT16 and FSC5531, have higher dough fermentability as compared with the control strains, FSC005, YST, RZT3, IAM4274 and NCIMB40328-40332; that is, the amount of carbon dioxide gas generated from the dough containing RRT16 and FSC5531 (sugar content: 5 or 15%) are as much as more than 100 ml after the storage under freezing and then under refrigeration and are as much as more than 80 ml after the storage under refrigeration and then under freezing.

In the present invention, yeast can be added to any dough prepared by kneading a mixture of flour or rye flour, salt and water. The dough prepared in the following manner is given as a representative example. Basic ingredients such as flour or rye flour, salt and fats are mixed with additional ingredients such as sugar, shortening, butter, skim milk, yeast food and eggs, if necessary, and then water is added to this mixture, followed by kneading.

When bread dough is stored under freezing and then under refrigeration before baking, the dough is first stored at −10 to −30° C., preferably −18 to −25° C., for 1 to 60 days, preferably 1 to 30 days, and then at −5 to 10° C., preferably 0 to 5° C., for 1 to 10 days, preferably 1 to 5 days.

When bread dough is stored under refrigeration and then under freezing, the dough is first stored at −5 to 10° C., preferably 0 to 5° C., for 1 to 10 days, preferably 1 to 5 days, and then at −10 to −30° C., preferably −18 to −25° C., for 1 to 60 days, preferably 1 to 30 days.

The conditions for the storage under freezing and refrigeration and the storage under refrigeration and freezing may further be combined as may be appropriate.

The process for making bread is described below.
Cultivation of Bread Yeast

Yeast cells which are suitable for bread-making are obtained by cultivating yeast in an ordinary culture medium containing carbon sources, nitrogen sources, inorganic substances, amino acids and vitamins, etc. under aerobic conditions, while adjusting the temperature at 27 to 32° C., and recovering and washing the cells.

As the carbon sources in the medium, glucose, sucrose, starch hydrolyzate, molasses, etc. can be used and especially preferred is molasses.

As the nitrogen sources, ammonia, ammonium chloride, ammonium sulfate, ammonium carbonate, ammonium acetate, urea, yeast extract, corn steep liquor, etc. can be used.

Magnesium phosphate, potassium phostate, etc. can be used as the inorganic substances; glutamic acid, etc. can be used as the amino acids; and pantothenic acid, thiamine, etc. can be used as the vitamins. Feeding cultivation is desirable as the cultivation method.

Process for Making Bread

Bread dough to be used is obtained by adding salt, fat, water and the yeast obtained as above to flour or rye flour. Sugar, shortening, butter, skim milk, yeast food, eggs, etc. may be added, if necessary. There are two kinds of typical methods for making one-loaf bread and buns, etc.; that is, the straight dough method and the sponge-dough method. The former is a method in which all the ingredients are mixed at a time. The latter is a method in which at first a sponge is made by kneading a part of flour and yeast with water, and then, after fermentation, the remaining ingredients are added to the sponge.

In the typical straight dough method, all the ingredients are mixed and kneaded, and the kneaded mixture is fermented at 25 to 30° C. (floor time) and then divided. The divided dough is molded after freezing and refrigeration, or frozen after refrigeration and molding. Then bread is made according to ordinary steps such as proofing and baking.

In the typical sponge-dough method, about 70% of the whole flour to be used, yeast, and yeast food are mixed and kneaded with water. The kneaded mixture is fermented for 3 to 5 hours at 25 to 35° C., and then mixed and kneaded with the remaining ingredients such as flour, water, salt, and shortening (dough mixing), followed by dividing. The divided dough is molded after freezing and refrigeration, or frozen after refrigeration and molding. Then bread is made according to ordinary steps such as proofing and baking.

Danish pastries, croissants, etc. are usually made in the following manner.

Ingredients, such as flour or rye flour, salt, the yeast obtained as above, sugar, shortening, eggs and skim milk are kneaded with water to prepare dough, and fat such as butter and margarine is folded into the dough. Rolling and folding are repeated to make multiple layers of the dough and the fat. This step of folding the fat is called "roll-in", which can be carried out by two methods. In one method, the temperature of the dough to be kneaded is lowered to about 15° C., and the dough is kneaded without cooling until the intended number of layers are made. Generally, the rise of dough temperature and fat temperature during the folding step causes a difference in extensibility between dough and fat, whereby the uniformity of layers is likely to be lost. To solve this problem, in the other method of roll-in which is so-called retarding method, cooling is repeated several times using a refrigerator or a freezer in the course of the roll-in step for the purpose of conditioning the properties of dough. The obtained dough is divided and subjected to the roll-in step, followed by refrigeration, molding and then freezing, or the obtained dough is divided and subjected to the roll-in step, followed by freezing, refrigeration and then molding. Thereafter, bread is made according to ordinary steps such as proofing and baking.

BEST MODE FOR CARRYING OUT THE INVENTION

Examples and comparative examples are shown below.

EXAMPLE 1

Cultivation of Bread Yeast

One platinum loopful of cells of the test yeast strain was inoculated into a 300-ml Erlenmeyer flask containing 30 ml of YPD medium, and cultivated at 30° C. for 24 hours. After the cultivation, the whole culture was transferred into a 2-liter Erlenmeyer flask with a baffle containing 270 ml of molasses medium (3% molasses, 0.193% urea, 0.046% potassium dihydrogenphosphate and 2 drops of defoaming agent), and cultivated at 30° C. for 24 hours. The culture was centrifuged, and the collected cells were washed twice with deionized water and dehydrated on an absorptive clay plate.

Process for Making Bread

Buns were made according to the following dough composition and steps.

| Dough Composition | (Parts by Weight) |
|---|---|
| Hard flour | 90 |
| Soft flour | 10 |
| Sugar | 25 |
| Salt | 1 |
| Whole eggs | 10 |
| Shortening | 5 |
| Yeast food (PAN DIA C-500 Kyowa Hakko Kogyo Co., Ltd.) | 0.1 |
| Dough improver (ELMIZER FT-100, Kyowa Hakko Kogyo Co., Ltd.) | 1.0 |
| Yeast cells (RRT16) | 6 |
| Water | 46 |

| Steps: | |
|---|---|
| Mixing | low speed (100 rpm: hereinafter the same shall apply); 3 minutes |
| | medium speed (190 rpm: hereinafter the same shall apply); 3 minutes |
| | high speed (290 rpm: hereinafter the same shall apply); 1 minute |
| | addition of shortening |
| | low speed; 2 minutes |
| | medium speed; 3 minutes |
| | high speed; 3 minutes |
| Kneading temperature | (22° C.) |
| Floor time | (15 minutes) |
| Dividing | (100 g) |
| Freezing | (−20° C., 7 days) |
| Refrigeration | (5° C., 4 days) |
| Benching | (room temp., 40 minutes) |
| Molding | (molder, roll shape) |
| Proofing | (40° C., 85% RH, 45 minutes) |
| Baking | (200° C., 12 minutes) |

The specific volume of the obtained buns was measured by the rapeseed displacement method. Also, the appearance and the crumb properties of bread were observed. The results are shown in Table 2.

EXAMPLE 2, COMPARATIVE EXAMPLES 1–4

Buns were produced by the same method as in Example 1, except that FSC5531, YST, IAM4274, RZT3 or NCIMB40329 was used as the yeast strain in the dough composition instead of RRT16. The specific volume of the obtained bread was measured and the appearance and the crumb properties were observed. The results are shown in Table 2.

TABLE 2

| Examples and Comparative Examples | Strains | Specific volume (cm³/g) | Evaluation* Appearance | Crumb properties |
|---|---|---|---|---|
| Examples | | | | |
| 1 | RRT16 | 5.42 | 3 | 3 |
| 2 | FSC5531 | 5.65 | 3 | 3 |

TABLE 2-continued

| Examples and Comparative Examples | Strains | Specific volume (cm³/g) | Evaluation* Appearance | Crumb properties |
|---|---|---|---|---|
| Comparative Examples | | | | |
| 1 | YST | 4.22 | 2 | 1 |
| 2 | IAM4274 | 2.84 | 1 | 1 |
| 3 | RZT3 | 4.13 | 2 | 1 |
| 4 | NCIMB40329 | 4.45 | 2 | 2 |

*Standard of evaluation
3: good
2: moderate
1: poor
(Hereinafter the same evaluation shall apply.)

As it is clear from Table 2, the buns made in Examples 1 and 2 were superior to the buns made in Comparative Examples 1–4 in specific volume, appearance and crumb properties.

EXAMPLE 3

Cultivation of Bread Yeast

The same procedure as in Example 1 was repeated.

Process for Making Bread

Danish pastries were made according to the following dough composition and steps.

| Dough Composition | (Parts by Weight) |
|---|---|
| Hard flour | 70 |
| Soft flour | 30 |
| Sugar | 10 |
| Salt | 1.2 |
| Shortening | 6 |
| Skim milk | 3 |
| Whole eggs | 10 |
| PAN DIA C-500 | 0.1 |
| ELMIZER FT-100 | 1.0 |
| Yeast cells (RRT16) | 6 |
| Water | 50 |
| Margarine for folding | 50 |

| Steps: | Mixing low speed; 3 minutes |
| | medium speed; 8 minutes |
| | high speed; 1 minute |
| | Kneading temperature (22° C.) |
| | Floor time (20 minutes) |
| | Dividing (1 kg × 4) |
| | Freezing (−20° C., 30 minutes) |
| | Roll-in [folding in three × twice (9 layers)] |
| | (Margarine for folding: 50% of the whole flour) |
| | Refrigeration (5° C, 2 days) |
| | Rolling [folding in three × once (27 layers), rolling into 4 mm in thickness] |
| | Dividing, molding (50 g roll) |
| | Freezing (−20° C., 14 days) |
| | Thawing (30° C., 60 minutes) |
| | Proofing (35° C., 75% RH, 70 minutes) |
| | Baking (200° C., 12 minutes) |

The evaluation of the specific volume, appearance and crumb properties of the obtained Danish pastries were conducted in the same way as in Example 1. The results are shown in Table 3.

EXAMPLE 4, COMPARATIVE EXAMPLES 5–8

Danish pastries were made by the same method as in Example 1, except that FSC5531, YST, IAM4274, RZT3 or NCIMB40329 was used as the yeast strain in the dough composition in Example 3 instead of RRT16. The specific volume of the obtained bread was measured and the appearance and the crumb properties were observed. The results are shown in Table 3.

TABLE 3

| Examples and Comparative Examples | Strains | Specific volume (cm³/g) | Evaluation Appearance | Crumb properties |
|---|---|---|---|---|
| Examples | | | 3 | 3 |
| 3 | RRT16 | 5.90 | | |
| 4 | FSC5531 | 5.95 | 3 | 3 |
| Comparative Examples | | | | |
| 5 | YST | 4.75 | 2 | 1 |
| 6 | IAM4274 | 4.87 | 2 | 1 |
| 7 | RZT3 | 4.10 | 1 | 1 |
| 8 | NCIMB40329 | 4.82 | 2 | 1 |

As it is clear from Table 3, the Danish pastries made in Examples 3 and 4 were superior to those made in Comparative Examples 5–8 in specific volume, appearance and crumb properties.

INDUSTRIAL APPLICABILITY

The present invention provides bread which is superior in specific volume, appearance and crumb properties.

We claim:

1. A process for making bread which comprises the steps of (1) kneading flour, yeast and water to prepare dough; (2) storing the dough under freeze conditions, and then under refrigeration conditions for at least one day, or storing the dough under refrigeration conditions for at least one day and then under freeze conditions; and (3) making bread from the dough, wherein the yeast is a strain belonging to the genus Saccharomyces which has freeze and refrigeration resistance and gives dough fermentability whereby the dough containing the yeast and 5–15% sugar generates carbon dioxide gas in an amount of more than 100 ml/0.6 g (yeast cells) at 30° C. in two hours after the storage at −20° C. for seven days and then at 5° C. for four days, or whereby the dough containing the yeast and 5–15% sugar generates carbon dioxide gas in an amount of more than 80 ml/0.6 g (yeast cells) at 30° C. in two hours after the storage at 5° C. for four days and then at −20° C. for seven days.

2. A process according to claim 1, wherein the dough is stored under freeze conditions at −10 to −30° C. for 1 to 60 days and then under refrigeration conditions at −5 to 10° C. for 1 to 10 days.

3. A process according to claim 1, wherein the dough is stored under refrigeration conditions at −5 to 10° C. for 1 to 10 days and then under freeze conditions at −10 to −30° C. for 1 to 60 days.

4. A process according to claim 1, wherein the flour is rye flour.

5. Dough containing yeast belonging to the genus Saccharomyces which has freeze and refrigeration resistance and gives dough fermentability in such a degree that the dough containing the yeast and 5–15% sugar generates carbon dioxide gas in an amount of more than 100 ml/0.6 g (yeast cells) at 30° C. in two hours after the storage at −20° C. for seven days and then at 5° C. for four days, or that the dough containing the yeast and 5–15% sugar generates carbon dioxide gas in an amount of more than 80 ml/0.6 g (yeast cells) at 30° C. in two hours after the storage at 5° C. for four days and then at −20° C. for seven days.

6. *Saccharomyces cerevisiae* which has freezing and refrigeration resistance and which gives dough fermentability in such a degree that dough containing the yeast and 5–15% sugar generates carbon dioxide gas in an amount of more than 100 ml/0.6 g (yeast cells) at 30° C. in two hours after the storage at −20° C. for seven days and then at 5° C. for four days, or that the dough containing the yeast and 5–15% sugar generates carbon dioxide gas in an amount of more than 80 ml/0.6 g (yeast cells) at 30° C. in two hours after the storage at 5° C. for four days and then at −20° C. for seven days.

7. *Saccharomyces cerevisiae* according to claim 6, wherein *Saccharomyces cerevisiae* is *Saccharomyces cerevisiae* FSC5531 deposited as FERM BP-4488 or *Saccharomyces cerevisiae* RRT16 deposited as FERM BP-4489.

8. A process for making bread which comprises the steps of (1) kneading flour, yeast and water to prepare dough; (2) storing the dough under freeze conditions, and then under refrigeration conditions for at least one day, or storing the dough under refrigeration conditions for at least one day and then under freeze conditions; and (3) making bread from the dough, wherein said yeast is obtained by cultivating at 30° C. for 12 hours in a medium comprising 1% yeast extract, 2% polypeptone and 2% glucose, and centrifuging to collect yeast cells, said cells are suspended in 0.067M potassium dihydrogenphosphate solution to a density of $1 \times 10^7$ cells/ml to give an absorbance of 1.0, irradiating the cell suspension with ultraviolet light such that the survival of the cells is about 1–30%, and subjecting the cells to primary, secondary, tertiary and quaternary selection, and wherein the yeast is a strain belonging to the genus Saccharomyces which has freeze and refrigeration resistance and gives dough fermentability whereby the dough containing the yeast and 5–15% sugar generates carbon dioxide gas in an amount of more than 100 ml/0.6 g (yeast cells) at 30° C. in two hours after the storage at −20° C. for seven days and then at 5° C. for four days, or whereby the dough containing the yeast and 5–15% sugar generates carbon dioxide gas in an amount of more than 80 ml/0.6 g (yeast cells) at 30° C. in two hours after the storage at 5° C. for four days and then at −20° C. for seven days.

9. A process according to claim 8, wherein said storing the dough under freeze conditions, and then under refrigeration conditions for at least one day includes storage under freezing in a freezer at −20° C. for seven days and storage under refrigeration at 5° C. for four days.

10. A process according to claim 8, wherein said storing the dough under refrigeration conditions for at least one day and then under freeze conditions includes the steps of storage under refrigeration at 5° C. for four days, and storing under freezing in a freezer at −20° C. for seven days.

* * * * *